H. W. N. COLE.
ROTARY COMPRESSOR.
APPLICATION FILED FEB. 12, 1908.

910,175.

Patented Jan. 19, 1909.
2 SHEETS—SHEET 1.

WITNESSES:
L. S. Andrews Jr.
F. Graves

INVENTOR
Henry W. N. Cole
BY
Chapin & Raymond
his ATTORNEYS

H. W. N. COLE.
ROTARY COMPRESSOR.
APPLICATION FILED FEB. 12, 1908.

910,175.

Patented Jan. 19, 1909.

2 SHEETS—SHEET 2.

WITNESSES:
Y. S. Andrews Jr.
F. Graves.

INVENTOR
Henry W. N. Cole
BY
Chapin Raymond
his ATTORNEYS

UNITED STATES PATENT OFFICE.

HENRY W. N. COLE, OF BROOKLYN, NEW YORK.

ROTARY COMPRESSOR.

No. 910,175.　　　Specification of Letters Patent.　　　Patented Jan. 19, 1909.

Application filed February 12, 1908. Serial No. 415,565.

*To all whom it may concern:*

Be it known that I, HENRY W. N. COLE, a citizen of the United States of America, and a resident of Brooklyn, county of Kings, State of New York, have invented certain new and useful Improvements in Rotary Compressors, of which the following is a specification, reference being had to the accompanying drawings, forming a part thereof.

My invention relates to improvements in rotary compressors and particularly to a rotary compressor comprising a crank shaft, the crank portion of which is located within the said cylinder, a roller piston mounted freely upon the said crank portion and adapted to bear with rolling contact against the inner periphery of the cylinder, one or more radially disposed sliding abutments, and suitable inlet and discharge valves communicating with the interior of the cylinder.

My invention relates particularly to an improved means for cooling the piston, such means comprising a structure providing for the circulation of water or other cooling medium through the piston; and to other features of construction and novel combinations of parts as will hereinafter be fully set forth.

For the complete understanding of my invention, I will now proceed to describe in detail an embodiment thereof, having reference to the accompanying drawings illustrating the same, and will then point out the novel features in claims.

Figure 1:
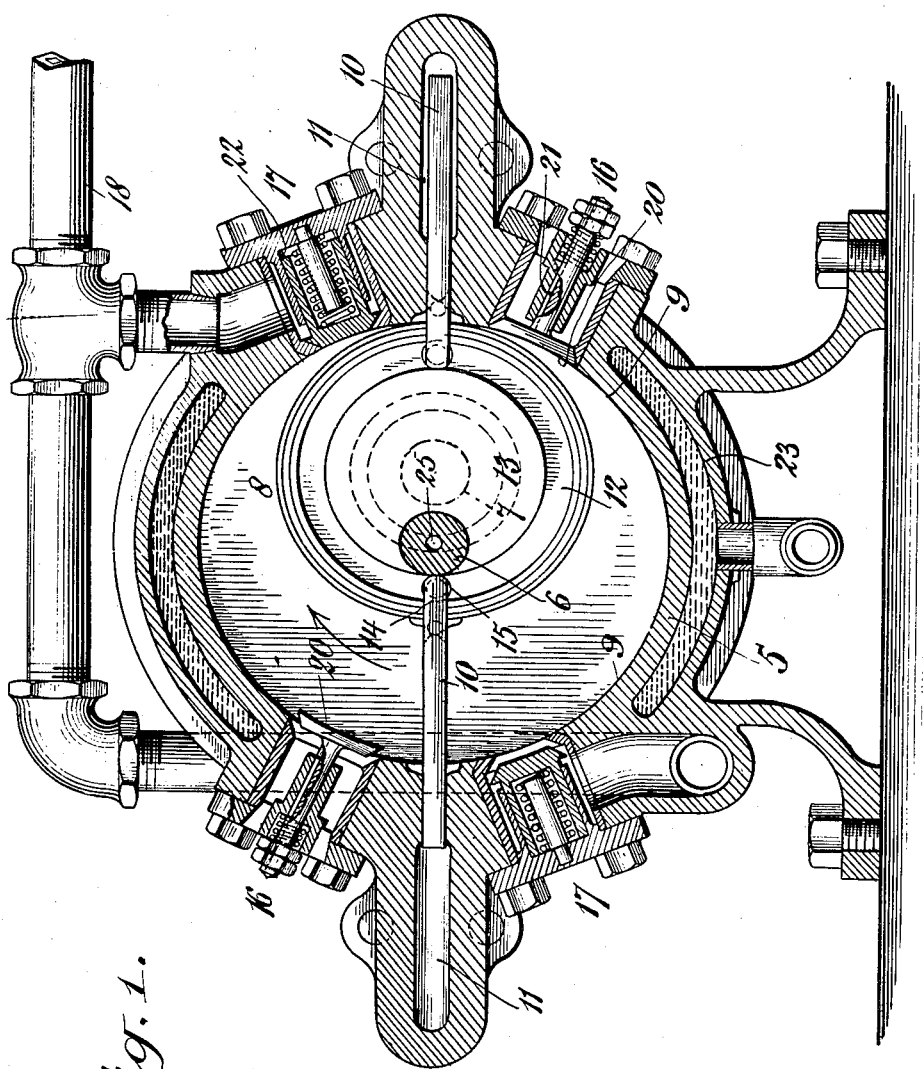
Figure 2:
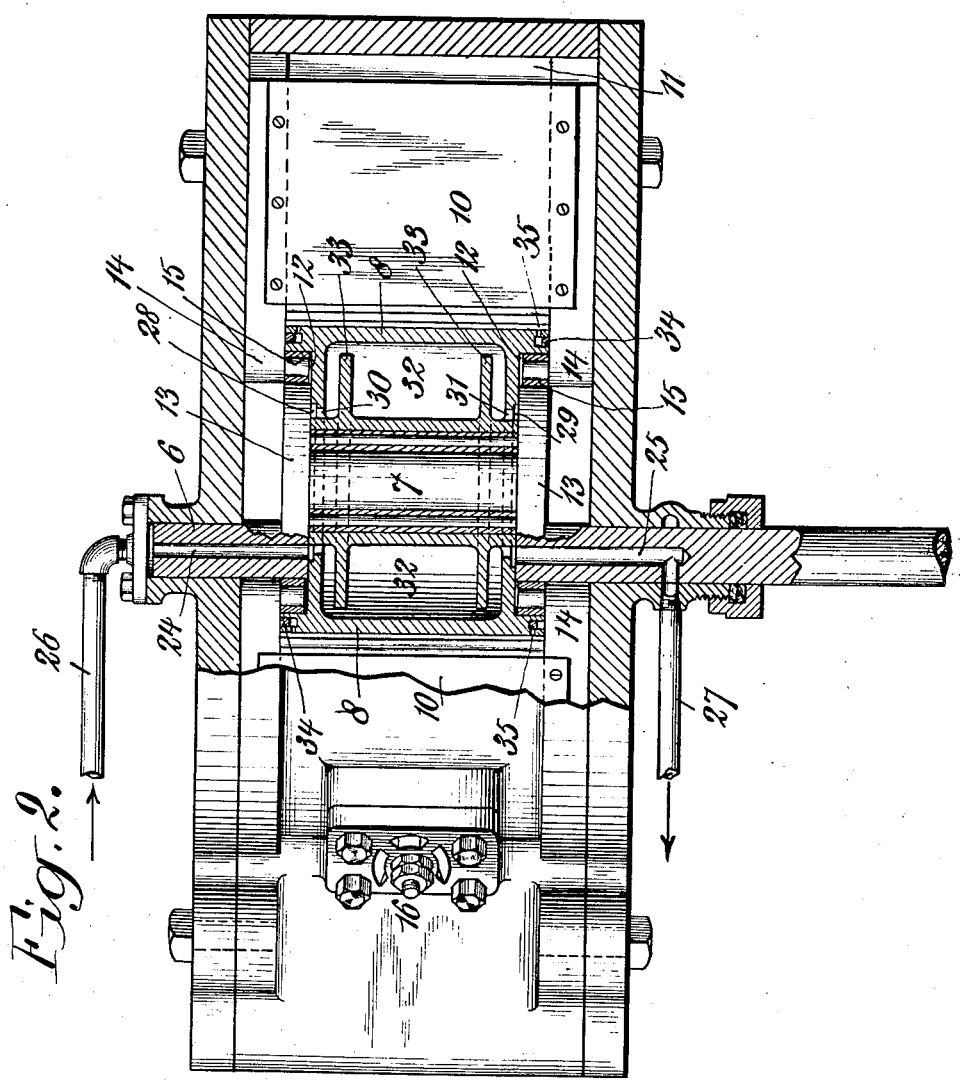

In the drawings:—Figure 1 is a view substantially in central transverse section through a rotary compressor embodying my invention. Fig. 2 is a horizontal view thereof in partial longitudinal section, and partial outside elevation.

The machine illustrated comprises a cylinder 5 a central crank shaft 6 having a crank portion 7 located within the said cylinder, a rolling piston 8 freely mounted upon the said crank portion 7, the said piston so disposed within the cylinder as to have its outer periphery in rolling contact with the inner peripheral wall 9 of the said cylinder, and a plurality of radially disposed sliding abutments 10 which, together with the piston, serve to subdivide the working space of the cylinder into several parts. The abutments are mounted in housings 11 in the cylindrical casing and engage the said piston at their inner ends whereby they are caused to move toward and away from the axial center of the crank shaft as the piston revolves. The piston is provided with annular grooves 12, the said grooves being formed on one side by the walls of the recesses in the side faces of the piston, and on the other by the circumferential edges of the disks 13 with which the crank shaft is provided upon opposite sides of the crank pin, and which are received within the recesses in the said side walls of the piston. The abutments are provided with arms 14 which straddle the piston, and which are provided with anti-friction rollers 15 which enter the grooves 12. These grooves then act as cam grooves to impart the required movements to the said abutments.

It may be noted that I make no claim to the construction just described, in the present application, as the same forms part of the subject matter of a separate application filed co-incidently herewith, and is claimed in such separate application.

The valve mechanism includes a pair of valves for each said abutment employed, each pair comprising an inwardly opening inlet valve 16 and an outwardly opening discharge valve 17. These valves are of the puppet type and are spring actuated in a direction to close them. When closed, the face of each said valve is arranged to be substantially co-incident with the inner peripheral wall of the cylinder, as will well be understood by reference to the drawings, whereby the said inner peripherial wall will present a substantially unbroken surface for the piston to roll against. All of the discharge valves 17 are connected with a common delivery conduit 18, the inlet valves being likewise connected with a common source of supply,—in this case, the atmosphere.

In operation, the crank shaft being driven from any suitable source, the piston 8 will be given a planetary or orbital movement in the cylinder in the direction of the arrow in Fig. 1. In such movement, the piston will draw in air behind it through an inlet valve 16 and will force air in front of it toward a discharge valve 17. The face of the valve 16 which has herein been stated to be substantially co-incident with the inner perripheral wall of the cylinder, is preferably curved as appears at 20 in the drawings and the stem of the valve is in such case splined, as at 21, in the valve casing, or is otherwise prevented from turning as otherwise the said valve might turn sidewise and present a projecting portion within the cylinder such as would, of course, be highly undesirable, similarly where the face of the valve 17 is curved, the trunk of the said valve may be splined in the casing as at 22.

The spaces inclosed between the piston, the wall of the cylinder and the nearest abutment in advance thereof will be gradually diminished in the rotation of the shaft and piston thereon, so that the air will be compressed therein until the pressure of the air is sufficient to overcome the tendency of the discharge valve to close, and the said air will then be discharged therethrough in a compressed condition as will be well understood, the said spaces being reduced finally to substantially nothing so that all of the air in any compartment, at a given time, will be discharged therefrom and a complete and efficient compression thereby obtained.

For the reason that the compressor is designed to be run at very high speeds and to compress air or other fluid to a high degree, it becomes desirable, if not actually necessary, to convey away as completely as possible the heat produced by such compression. For this purpose I provide a thorough water jacket for the cylinder, such water jacket being shown at 23 in the drawings, and I also provide a means for circulating water or other cooling medium through the piston. For this latter purpose, I provide a hollow inlet passage 24 in the shaft 6 upon one side of the crank 7, and a hollow discharge passage 25 through the shaft 6 upon the other side of the said crank 7, and I connect the inlet passage 24 with a constant source of supply by means of a supply pipe 26, and I connect the discharge passage 27 with a point of discharge by means of a discharge pipe 27 as will be seen by reference to Fig. 2 of the drawings. I connect the inner ends of the inlet and discharge passages 24 and 25 with cylindrical chambers 28 and 29 formed in recesses in the opposite side faces of the piston 8, the said chambers being closed by the inner faces of the disks 13 upon the crank shaft 6, and I provide ports or openings 30—31 which connect the said chambers 28—29 with the interior of the piston, said piston being formed as a hollow shell, the interior thereof constituting a chamber 32 for receiving cooling fluid admitted thereto through the ports or passages 30, the chamber 28, and the inlet passage 24 from the supply pipe 26. I further supply the said piston interiorly with baffle plates 33 by which the cooling medium will be directed toward that portion of the piston which is nearest to its exterior periphery, such being the point at which the heat is applied. Once the cooling medium has been directed toward this point, it will have a tendency to remain as far away from the axial center of the piston as possible, due to the action of centrifugal force, but as it reaches the opposite wall of the piston, it will be caused to descend and will finally be discharged through the ports or passages 31 into the chamber 29, and thence through the discharge passage 25 to the discharge pipe 27. By means of the baffle plates, the cooling medium is caused to follow a course where it will absorb the greatest amount of heat, rather than to pass directly across the piston near its center from the inlet to the discharge ports or passages.

In order to prevent leakage past the side faces of the piston, either on the part of the cooling medium into the interior of the cylinder or of the air or gas from the interior of the cylinder in a direction toward the center of the piston, I have provided suitable packing rings 34 which are mounted in recesses in the side faces of the piston, such rings being forced outwardly by suitable means, such as by air or gas under pressure which may be admitted to the rear of said piston through ports or passages 35. The construction of these packing rings is not, however, claimed in the present specification, the same forming a part of the subject matter of the separate application filed co-incidently herewith which has been hereinbefore referred to.

What I claim is:

1. In a rotary compressor, the combination with a cylinder and a crank shaft, of a hollow roller piston mounted freely upon the crank portion of the said shaft within the cylinder, means for admitting and discharging a cooling medium to and from the said piston at points near the axis thereof, and baffle plates for directing the stream of the said cooling medium toward and from a point further from the axial center of the said piston.

2. In a rotary compressor, the combination with a cylinder, and a crank shaft having hollow portions on opposite sides of its crank portion and disks upon opposite sides of the said crank portion concentric with the said crank portion, of a hollow roller piston mounted freely upon the crank portion between the disks, the said piston having recesses in its side walls which are closed by the said disks, said recesses constituting chambers and arranged in constant communication with the hollow portions of the shaft respectively, and with the interior of the piston.

3. In a rotary compressor, the combination with a cylinder, and a crank shaft having hollow portions on opposite sides of its crank portion and disks upon opposite sides of the said crank portion concentric with the said crank portion, of a hollow roller piston mounted freely upon the crank portion between the disks, the said piston having recesses in its side walls which are closed by the said disks, said recesses constituting chambers and arranged in constant communication with the hollow portions of the shaft respectively, and with the interior of the piston and baffle plates within the piston substantiallly as set forth.

HENRY W. N. COLE.

Witnesses:
F. W. CAREY,
EDNA LYFE.